Nov. 1, 1960  J. C. LICKLIDER  2,958,729
INFORMATION SIGNAL INTELLIGIBILITY MEASURING APPARATUS
Filed Oct. 1, 1957  3 Sheets-Sheet 1

INVENTOR.
JOSEPH C. LICKLIDER
BY Walter J. Kruba
ATTORNEY

Nov. 1, 1960  J. C. LICKLIDER  2,958,729
INFORMATION SIGNAL INTELLIGIBILITY MEASURING APPARATUS
Filed Oct. 1, 1957  3 Sheets-Sheet 2

INVENTOR.
JOSEPH C. LICKLIDER
BY
Walter J. Kreeler
ATTORNEY

Nov. 1, 1960   J. C. LICKLIDER   2,958,729
INFORMATION SIGNAL INTELLIGIBILITY MEASURING APPARATUS
Filed Oct. 1, 1957   3 Sheets-Sheet 3

INVENTOR.
JOSEPH C. LICKLIDER
BY
*Walter J. Kreiske*
ATTORNEY

United States Patent Office 2,958,729
Patented Nov. 1, 1960

2,958,729
INFORMATION SIGNAL INTELLIGIBILITY MEASURING APPARATUS

Joseph C. Licklider, Arlington, Mass., assignor to General Electronic Laboratories, Inc., Cambridge, Mass., a corporation of Massachusetts Filed Oct. 1, 1957, Ser. No. 687,421

11 Claims. (Cl. 179—1)

This invention relates to apparatus for measuring the intelligibility of information signals such as speech, and more particularly to apparatus for sampling such information signals and automatically indicating the intelligibility index of the sample. Intelligibility index, as herein used, refers to a value or figure arbitrarily assigned within a specified range of values for indicating the relative intelligibility of such information signals as words, syllables or sentences and the like in the presence of interfering signals or noise.

Because of the complexity of determining the effect of sound impressions on the human ear, testing for the intelligibility of speech with the human ear itself as the testing device is very time consuming. Also, because of human variance in both applying tests and obtaining intelligibility response from a person, as well as variance in hearing characteristics among people, the intelligibility index obtained thereby may vary appreciably with the individuals performing the tests. Such time and human variance problems become particularly acute where it is desired to test equipment to determine the effect of such equipment on the intelligibility of the information signals operated upon by such equipment and also where it is desirable to make comparisons of such operating characteristics between equipments.

Pursuant to the present invention, these problems are overcome in an apparatus which also incorporates other desirable features and advantages. In addition to removing the above mentioned human element and improving the repetitive accuracy of test results, other features and advantages include a broadened variety of applications of signal intelligibility testing, as well as simplified procedure for making such tests. Another desirable feature is that the present invention provides a self-contained apparatus capable of producing highly accurate test results without the need of special sound rooms or other extraneous equipment.

Accordingly, a primary object of the present invention is the provision of a system and apparatus for accurately and automatically measuring the intelligibility of signal information in the presence of interfering signals or noise.

Another object of the present invention, is the provision of a speech intelligibility measuring system having a broadened range of applicability.

A further object is the provision of a speech intelligibility measuring system applicable where non-linear as well as linear distortion of the signal information, and non-linear as well as linear additions of noise or interference signals, are involved.

And a further object is the provision of a speech intelligibility measuring system which needs only the premise that the speech input signal to the system is intelligible.

Another object is the provision of a signal intelligibility measuring system which measures the gradation of intelligibility due to gradation of the level of noise or other interfering signals.

And a still further object of the present invention is the provision of an information signal intelligibility measuring system which is based on the preservation of the running power spectrum of speech as distinguished from long term power spectrum changes, and which is a normalized correlation between the running power spectra of the input and the output signals of the speech communication system under test. The term normalized as herein used means removing slow or long term changes in the power spectrum of the speech from influencing the comparison.

And a further object is the provision of speech intelligibility measuring apparatus using an equally weighted time scale and a frequency scale specifically weighted to reflect the importance for intelligibility of the various bands of speech spectrum. In the middle region, the speech bands are very important to intelligibility. Near zero and above 2000 cycles per second, the bands are less important to intelligibility.

And another object is the provision of a speech intelligibility measuring system which devotes time parcels to the various parts of the physical frequency scale in proportion to their respective importance to intelligibility of the speech.

These objects, features, and advantages are achieved generally by providing a pair of signal traversing channels, one of the channels for measuring the magnitude of the power of the information signal which is free of noise or other interfering signals, the other channel for measuring the magnitude of the power of the information signal, noise or other interfering signals appearing with the information signal, an apparatus coupled to both of the channels for comparing the power values, and a meter coupled to the comparing apparatus for indicating the comparison.

By providing a scanning oscillator coupled to a modulator in each of the channels and a narrow band filter of identical construction in each of the channels and fed by the respective modulator, the examination of a small portion of the speech spectrum at any given time is thereby achieved.

By providing a scanning oscillator having a sufficiently broad range of frequencies, the entire speech spectrum may thereby be examined.

By providing a cam device for driving the oscillator to produce a scan time of equal length over each frequency spectrum portion of equal importance to intelligibility, uniformity and accuracy of output is thereby achieved.

By providing automatic gain control circuits at the outputs of the narrow band filters, the short time average power is allowed to vary while the long time average power held to a substantially constant level. This adjustment to equality of the long time average power level of the information signal in the signal channel and the information signal-plus-noise in the signal-plus-noise channel is herein termed normalizing.

By providing a difference or comparison amplifier and a rectifier at the output of each of the narrow band filters with the rectifiers feeding the comparison amplifier, and a resistor, capacitor network for integrating the difference output of the comparison amplifier, intelligibility indication can be directly read from the integrating network by a voltmeter properly calibrated in intelligibility index units and coupled to the integrating network.

These and other features, objects and advantages of the present invention will become more apparent from the following description taken in connection with the accompanying drawings of a preferred embodiment of the invention and wherein.

Figure 1:
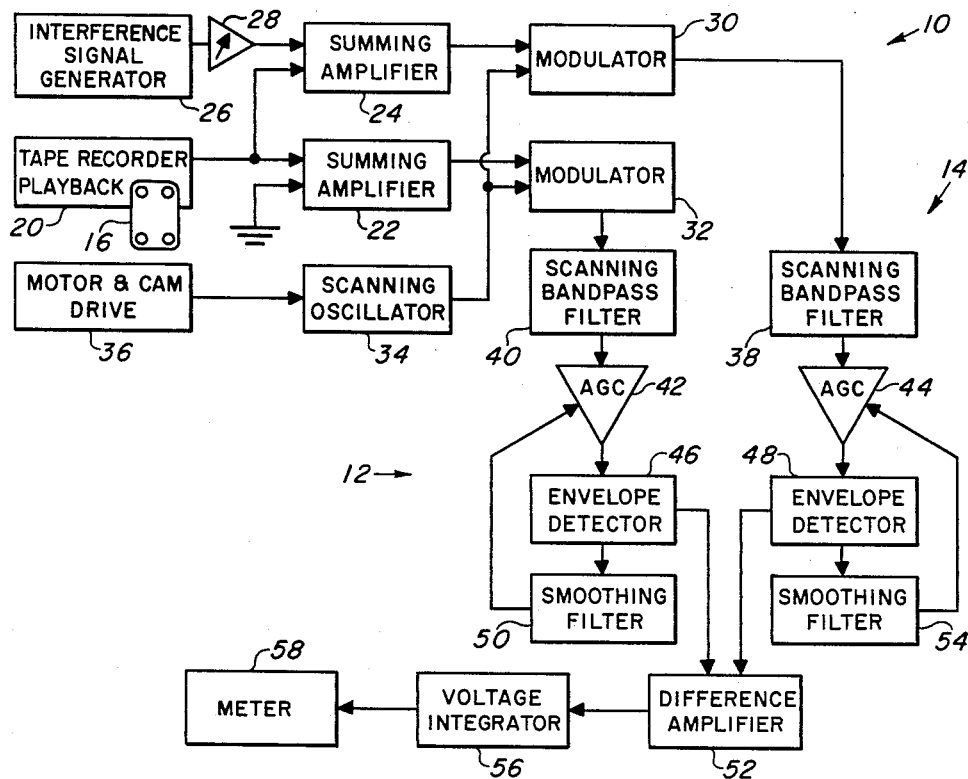
Fig. 1 is a block diagram of an intelligibility measuring apparatus made in accordance with the present invention.

Referring to Fig. 1 in more detail an intelligibility measuring apparatus made in accordance with the present invention is designated generally by the numeral 10. The intelligibility measuring apparatus 10, in the present instance is specifically adapted for operation with speech information signals in the presence of noise or as affected by the combination of noise and of distortion occurring in equipment under test.

The speech intelligibility measuring apparatus 10 has a pair of channels 12 and 14. The channel 12 is for speech signals free of noise to be used as a reference level for the channel 14. The channel 14 is traversed by the same speech signals as in channel 12 together with interfering noise, distortion or other interference affecting the intelligibility of the speech signals. The intelligibility measuring equipment 10 obtains its results by comparing the signal levels in the two channels 12 and 14 as will hereinafter be more fully described.

Figure 9:
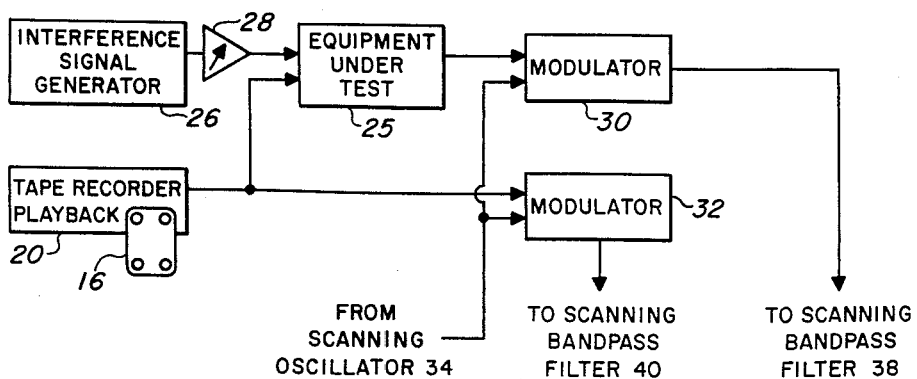
Fig. 9 is a block diagram of a portion of the intelligibility measuring apparatus of Fig. 1 arranged for operating on an equipment under test.
Figure 2:
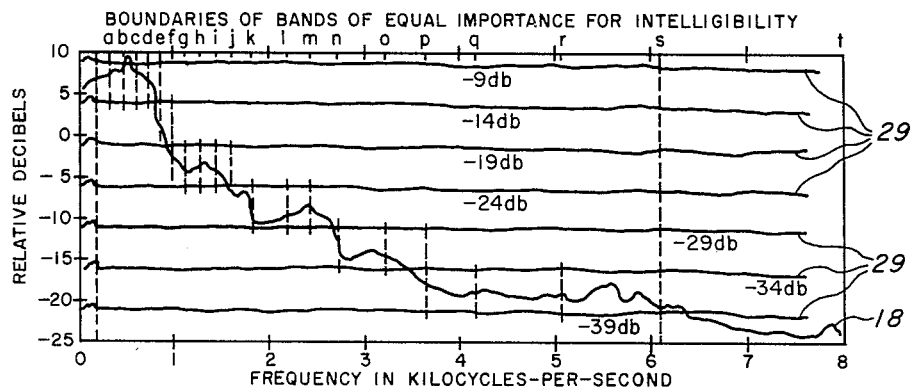
Fig. 2 is a diagram of representative speech and noise spectrums with the speech spectrum divided into bands of equal importance for intelligibility to more clearly illustrate the operation of the present invention.

The input speech signals whose intelligibility is to be measured may be provided by an endless loop of magnetic tape 16, containing a suitable speech sample preferably covering an average speech spectrum such as shown by a curve 18 in Fig. 2. The speech information recorded on the magnetic tape 16 may be played back by a conventional tape recorder 20 and fed to a summing amplifier 22 in the speech traversing channel 12 and simultaneously to another summing amplifier 24 in the speech-plus-noise traversing channel 14. The summing amplifiers 22 and 24 are carefully selected to be identical to each other in response characteristics in order to balance each other in the two channels 12 and 14. The summing amplifiers 22 and 24 are used in the present instance where it is desired to measure the intelligibility of the speech information on the magnetic tape 16 at different levels of noise interference for initially calibrating the speech intelligibility measuring apparatus 10 as will be described. In the event the speech intelligibility measuring apparatus 10 is used for testing speech traversing systems or equipment 25 (Fig. 9) such as receivers, the summing amplifier 24 would be replaced by the receiver or other equipment under test 25 and the summing amplifier 22 would be completely removed as shown in Fig. 9. The reason for such a substitute arrangement to perform tests on equipment 25 will become more apparent as this description progresses.

In the present instance an interference or noise signal is provided by an interference signal generator 26 having an input amplitude level controlled by a manually set variable amplifier 28. The interference signal from the amplifier 28 is fed to the summing amplifier 24 along with the speech information signal from the tape recorder playback 20. The interference signal or noise generator 26 may be of any suitable design and in the present instance is preferably of the type to provide substantially white noise, that is, noise including frequencies throughout the spectrum at substantially a uniform level. For example, a random noise generator model 455–A made by the Grason-Stadler Company has been found suitable for this purpose. Curves 29 in Fig. 2 represent exemplary noise level settings on the variable amplifier 28. Each of the noise level curves 29, for the above mentioned calibration, may be used in a separate test run as will be hereinafter further described.

The output of speech and noise from the summing amplifier 24 is fed to a modulator 30 in the speech and noise signal traversing channel 14. The pure speech signals from the summing amplifier 22 are fed to another modulator 32 in the speech signal traversing channel 12. The modulators 30 and 32 are of identical design and characteristics, as are also other corresponding components in the channels 12 and 14.

A heterodyning signal is also fed to the modulators 30 and 32, from a varying frequency scanning oscillator 34. The frequency of the heterodyning signal from the varying frequency carrier oscillator 34 is made to vary slowly with time by a motor and cam drive 36. A conventional motor drive and cam arrangement 36 may be used. The cam and motor drive 36 are so designed that in the present instance twenty bands of equal importance (the boundaries of which are identified by letters "a" through "t" in Fig. 2) in the speech spectrum will each be scanned in equal time intervals in the intelligibility measuring equipment 10. This timing arrangement has been used herein as an advantageous application for comparison of results to the French and Steinberg computation described at page 90 of the January 1947 issue of the Journal of Acoustical Society of America. However, where desider, the motor and cam drive 36 may be arranged for other suitable time interval variations.

Heterodyning frequencies from the scanning oscillator 34 varying over the range of 40 kilocycles down to 24 kilocycles have been found suitable where the tape recorder playback 20 has been run at twice the normal speed of the recorded speech on the tape 16. The reason for this is that where the normal speech spectrum, as shown in Fig. 2, varies from 0 to 8 kilocycles, it will be twice that or 16 kilocycles in the channels 12 and 14 because of increased speed of the tape recorder playback 20. The reason for doubling the speed of the tape recorder playback 20 to provide a saving in test time for obtaining the intelligibility reading from the intelligibility measuring apparatus 10.

The heterodyning frequency signals from the varying frequency scanning oscillator 34 in varying from 40 kilocycles to 24 kilocycles, which frequency signals are fed to the modulators 30 and 32, thereby effectively scan the audio spectrum of the pure speech signals from the summing amplifier 22 in the modulator 32 and the combined speech and noise signals from the summing amplifier 24 in the modulator 30.

The outputs of the modulators 30 and 32 are fed to scanning bandpass filters 38 and 40 respectively. The scanning bandpass filters 38 and 40 have narrow bandpass characteristics and in the present exemplary embodiment are tuned to 40 kilocycles with a band width of 180 cycles per second between half power points. The scanning bandpass filters 38 and 40 are carefully matched to have identical bandpass characteristics and operate on the heterodyne wave analyzer principle. Since both modulators 30 and 32 are driven by the same scanning carrier from the variable frequency oscillator 34 which moves along very slowly in frequency, spending time approximately equal to that of one complete loop of the recording tape 16 to make one of the frequency intervals or bands of equal importance for intelligibility shown in Fig. 2. For example, the carrier oscillator 34 is driven through that portion of its frequencies corresponding to the boundaries a and b of equal importance for intelligibility in Fig. 2 in the same interval of time as that required for driving over the carrier frequencies corresponding to the broader bands represented between the boundaries r and s of equal importance for intelligibility shown in Fig. 2. The timing is such that for each of these intervals, the recording tape 16 will have made approximately one complete loop or total of 20 loops for the 20 bands of equal importance for intelligibility shown in Fig. 2. In this manner, the input speech in the channel 12 and the speech-plus-noise in the channel 14 are separated into narrow frequency bands of equal importance for intelligibility so that the analysis can be made upon one band at a time.

During any one of these bands, the beat frequency caused by combining with the heterodyning signal will be 40 kilocycles. This beat frequency of 40 kilocycles will pass through the scanning bandpass filters 38 and 40. Thus, the output of the scanning bandpass filter 38 will correspond to the part of the input speech from the recording tape 16 having a frequency that lies within a narrow frequency interval within a band of equal importance for intelligibility identified in Fig. 2. The output from the scanning bandpass filter 40 corresponds to that part of the output speech-plus-noise signals that lie within the same frequency band. Its center frequency is equal to the difference between the center frequency of the filter (40 kilocycles) and the frequency to which the scanning oscillator 34 is tuned at that moment.

Having obtained a narrow band of the input speech from the tape 16 and a corresponding narrow band of the speech-plus-noise from the generator 26, it is necessary to make measurements of the signals insensitive to slow fluctuations in the overall level of the signals, except in so far as those fluctuations which handicap the signals by letting the noise override them, or favor the signals by letting the signals override the noise. Making measurements of the signals insensitive to slow fluctuations in the overall level is herein termed normalizing.

This normalizing is accomplished by providing an automatic gain control circuit 42 based upon average power in the respective channel. Such automatic gain control circuit 42 is arranged in channel 12 to receive the output of the scanning bandpass filter 40. An automatic gain control circuit 44 having the same characteristics as the automatic gain control circuit 42 is similarly arranged to receive the output of the scanning bandpass filter 38 in the speech-plus-noise channel 14. The outputs of the automatic gain control circuits 42 and 44 are fed to envelope detector circuits 46 and 48 in the channels 12 and 14 respectively.

The envelope detector circuit 46 feeds both a smoothing filter 50 and a difference amplifier circuit 52. In similar manner, the envelope detector 48 which is similar to the envelope detector 46 feeds a smoothing filter 54 and the difference amplifier 52. The smoothing filters 50 and 54 are resistor-capacitor type circuits which provide a smoothed, full wave rectified voltage in the respective channel as a good approximation to average power in the respective channel. Such automatic gain conage in channel 12 is fed back from the smoothing filter 50 to the automatic gain control 42 for providing the above described normalization in channel 12.

Similarly, the average power voltage in the smoothing filter 54 is fed back to the automatic gain control 44 in the channel 14 to provide normalization in the channel 14. The reason for the need for normalization of the signals traversing the channels 12 and 14 is to provide a condition similar to that in the human auditory system which adapts to slow fluctuations in the overall level of a sound signal. By slow fluctuations is meant a time constant of of about two seconds in the present design. While this is a relatively short time constant from the point of view of the human ear, it was found desirable to minimize the effective transients associated with switching from operation in both channels simultaneously to operation in the channel 12 for speech alone to make a control test for reference during one rotation of the recording tape loop 16. While this time constant was found suitable in the present instance, it is cited here for illustration only and other time constants may also be used where desired.

The envelope detectors 46 and 48 are full wave rectifiers followed by smoothing filters designed to extract or detect the envelopes of the speech signals in channel 12 and the speech-plus-noise signals in channel 14 so that they can be compared. A time constant of smoothing in the envelope detectors 46 and 48 was found suitable at .015 second, which is the value selected to minimize the variations corresponding to laryngial vibrations (voice pitch) without attenuating the phonemic variations, since the phonemic variations are the essential carriers of intelligibility. These envelope waves from the envelope detectors 46 and 48 reaching the difference amplifier 52 are those that have been subjected only to the minimum smoothing time constant of .015 second. Thus, the envelope contains the temporal range between .015 and .25 within which phonemic information resides. It should be also noted here that these variations take place within a narrow band of frequencies due to the scanning bandpass filters 38 and 40. The narrow bandpass filters 38 and 40, as stated above, have a passband of 180 cycles per second whose reciprocal is about .006 second per cycle which is constrained on the short period end by the integration inherent in the filters that select out the band.

The difference between the two voltages in the single envelopes reaching the difference amplifier 52 is determined in the difference amplifier 52 where it is rectified to permit the output to be independent of the sign of the difference. This absolute difference value voltage is then fed from the difference amplifier 52 to a voltage integrator circuit 56. Voltage integrator circuit 56 integrates the instantaneous values of this difference output from difference amplifier 52. This integrated difference is summed up over a complete scanning cycle of the scanning oscillator 34 which includes the band of frequencies in the speech spectrum shown in Fig. 2. This summation is accomplished by utilizing a long time constant resistor capacitor network (Fig. 8) as a continuous integration operation. In the present embodiment, the time required for a complete test run over the entire frequency spectrum is approximately twenty minutes.

At the conclusion of the test run, intelligibility is read out on the meter 58. The meter 58 may be a suitable conventional voltmeter which indicates the integrated potential difference across the resistor capacitor summing network in the voltage integrator 56. By suitable calibration of the meter 58, the indication for a test run may be read directly in intelligibility index units.

For calibrating the meter 58, one test run with the noise level from the interference signal generator 26 being at zero may be used to provide an intelligibility reading on the meter 58 arbitrarily assigned at unity to indicate maximum intelligibility of the input signal from the tape recorder playback 20. Another test run may be made with the noise level shown by the 9 db curve 29 in Fig. 2 to produce a reading on the meter 58 arbitrarily assigned a value of zero intelligibility. By using a meter 58 with a linear voltage scale, the space between the unity and zero readings may be divided equally to thereby directly produce an output intelligibility index scale.

Having calibrated the meter 58 with the test arrangement as shown in Fig. 1 an equipment under test may be placed in the apparatus 10 as shown in Fig. 9 and test runs made at each of the noise level curves 29 of Fig. 2. The results of each of these test run readings from the meter 58 may be plotted to produce a response curve as 186 (Fig. 3) which is characteristic of the particular equipment under test. Other equipments similarly tested may have other response curves which may provide a desirable source for comparison of the merits of the various equipments tested.

Figure 3:
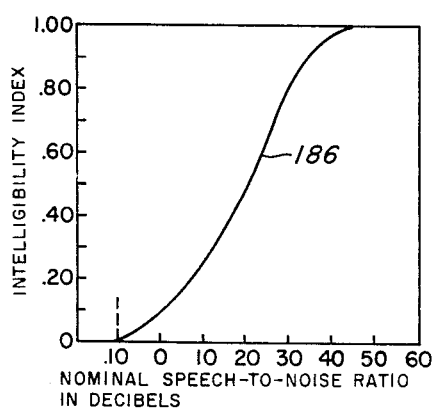
Fig. 3 is a diagram of intelligibility index as computed from results of the intelligibility measuring apparatus in Fig. 1.

The nominal speech to noise ratio used as the abscissa in Fig. 3 was found by using a long time constant root-mean-square voltmeter for measuring the speech signal level of the tape 16 from the tape recorder playback 20. The test run noise signal level from the interference generator was similarly measured with the same voltmeter.

Figure 4:
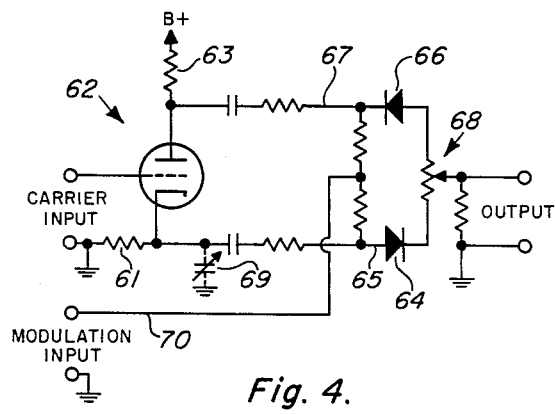
Fig. 4 is a schematic diagram of a modulator suitable for use in the embodiment shown in Fig. 1.

A circuit diagram of a modulator suitable for use as the modulator 30 and the modulator 32 is shown in Fig. 4. The carrier input from the scanning oscillator 34 is fed to a phase splitting triode amplifier 62 with equal resistors 61 and 63 in the anode and cathode circuits. The outputs of the triode amplifier 62 are delivered through a pair of diodes 64 and 66 in balanced lines 65 and 67 to an output load resistor network 68. A compensating capacitor 69 may be used for achieving proper balance. Since the diodes 64 and 66 are inverted with respect to each other the scanning carrier signal from the scanning oscillator 34 is balanced out across the load resistor network 68. The scanning signal, however, serves the function of switching the diodes for the modulation signal across the balanced output lines 65 and 67 appearing from line 70 from the summing amplifier 24 (Fig. 1) or the equipment under test 25 (Fig. 9) in the case of modulator 30, or from the summing amplifier 22 (Fig. 1) or tape recorder playback 20 (Fig. 9) in the case of modulator 32. The resultant effect is that the modulation signal from line 70 is switched off and on at the scanning signal frequency rate while the scanning frequency signal itself is suppressed. Thus, the output of the modulators 30 and 32 consists of two sidebands, only one of which is accepted by the scanning bandpass filters 38 and 40 respectively.

Figure 5:
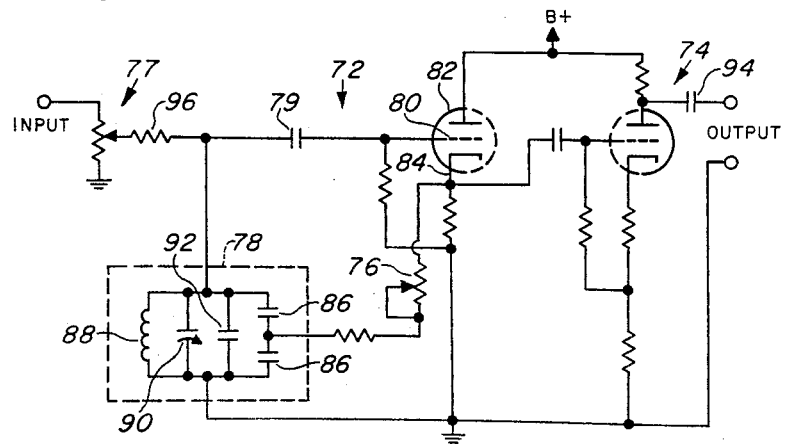
Fig. 5 is a schematic diagram of a scanning bandpass filter suitable for use in the embodiment shown in Fig. 1.

A schematic diagram of a circuit suitable for use as the scanning bandpass filter 38 and the scanning bandpass filter 40 is shown in Fig. 5. The scanning bandpass filter in Fig. 5 is basically a Q multiplier type circuit and includes two sections 72 and 74 connected in cascade. The filter section 72 consists of a stage using a controlled positive feedback with a tuned inductive capacitive circuit 78 in the feedback loop.

The input from the modulator 30 or 32 is fed through an input level control potentiometer resistor network 77 and a coupling capacitor 79 to a grid 80 of an electron tube 82 in the filter section 72.

Positive feedback is obtained by connecting cathode 84 of the tube 82 to a center tap on a pair of capacitors 86 in the inductive capacitive network 78. The inductive capacitive network 78 also includes an inductive winding 88 in parallel with a trimmer capacitor 90 for minor frequency adjustments and a temperature compensating capacitor 92 to reduce drift from temperature changes to an acceptable percentage. A variable series resistance 76 controls the feedback amplitude, and in this manner provides for adjustment of the "Q" of the filter.

The second stage 74 is a triode amplifier whose output is fed through a coupling capacitor 94 to the automatic gain control circuit 42 or 44, depending on the channel involved.

Loading of the tuned circuit 78 is reduced by a 6.8 megohm isolation resistor 96 in the resistive network 76.

Figure 6:
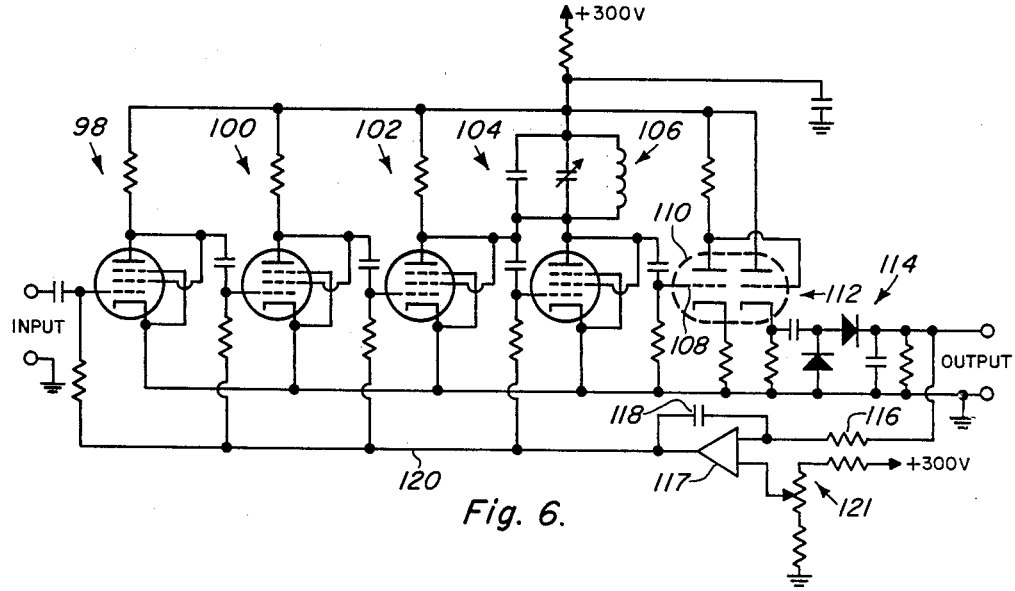
Fig. 6 is a schematic diagram of an automatic gain control, envelope detector and smoothing filter circuits suitable for use in the embodiment shown in Fig. 1.

A schematic diagram of circuits suitable for use as the automatic gain control amplifier 42 or 44, the envelope detector 46 or 48, and the smoothing capacitor 50 or 54 is shown schematically in Fig. 6. The automatic gain control amplifier circuit in Fig. 6 consists of four gain controlled stages 98, 100, 102 and 104, each utilizing the variable mu characteristic of a 6BA6 pentode. Each pentode is triode connected to reduce internal noise, while the last control stage 104 has a broad tuned circuit 106 at its plate load for further reduction of noise outside its bandpass. The output of the last control stage 104 is fed to a grid 108 of a triode voltage amplifier electron tube 110, directly coupled to a cathode follower 112. The cathode follower 112 drives an envelope detector circuit 114 suitable for use as the envelope detector 46 or 48.

Automatic gain control is achieved by using the D.C. component of the output of the envelope detector circuit 114 and feeding it back through a 20 megohm resistor 116 and a high gain D.C. amplifier 117, across which is connected a one microfarad capacitor 118, to an automatic gain control line 120. A variable resistor network 121 coupled between a D.C. power source and ground provides a suitable reference potential source for the amplifier 117. The amplifier 117 may be of the type known commercially as K2–X and further described in connection with Fig. 8.

The capacitor 118 and resistor 116, with the associated amplifier 117 and resistor network 121 form a smoothing filter circuit suitable for use as the smoothing filter 50 and the smoothing filter 54.

Figure 7:
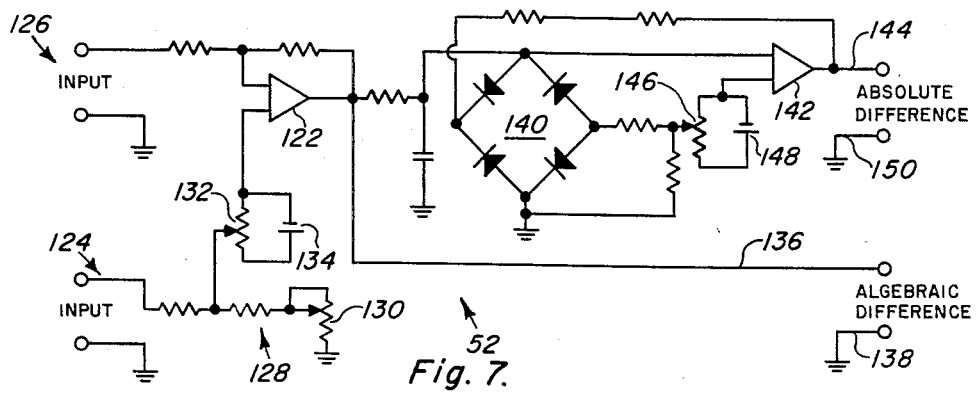
Fig. 7 is a schematic diagram of a difference amplifier suitable for use in the embodiment shown in Fig. 1.

A schematic diagram of a difference amplifier circuit suitable for use as the difference amplifier 52 is shown in Fig. 7. The difference amplifier circuit in Fig. 7 includes a conventional differential amplifier 122 which has two inputs 124 and 126 from the envelope detectors 48 and 46 respectively. The differential amplifier 122 may be of the type known commercially as K2–X. The input 124 has a resistor network 128 which includes an adjustable D.C. gain balance resistor 130 connected to ground and a potentiometer resistor 132 across a D.C. power source such as a battery 134 for providing a reference zero set for the input signal level to the differential amplifier 122. The output of the differential amplifier 122 provides the algebraic difference of the signals supplied at the inputs 124 and 126. This alegbraic difference appears in the output line between the output line 136 and ground line 138.

The differential amplifier 122 is followed by a full wave bridge rectifier 140 which is used to obtain single polarity representation of the difference signal output from the differential amplifier 122 to facilitate integration of this signal. The full wave bridge rectifier 140 feeds a second differential amplifier 142 which is used as the output stage. The second differential amplifier 142 may be the same type as the amplifier 122. Output line 144 from the difference amplifier 142, which with the aid of the setting on a variable resistor 146 across a D.C. power source as a battery 148 providing a suitable zero setting, carries a signal which between the line 144 and ground line 150 is an absolute difference between the signals at the inputs 124 and 126.

Figure 8:
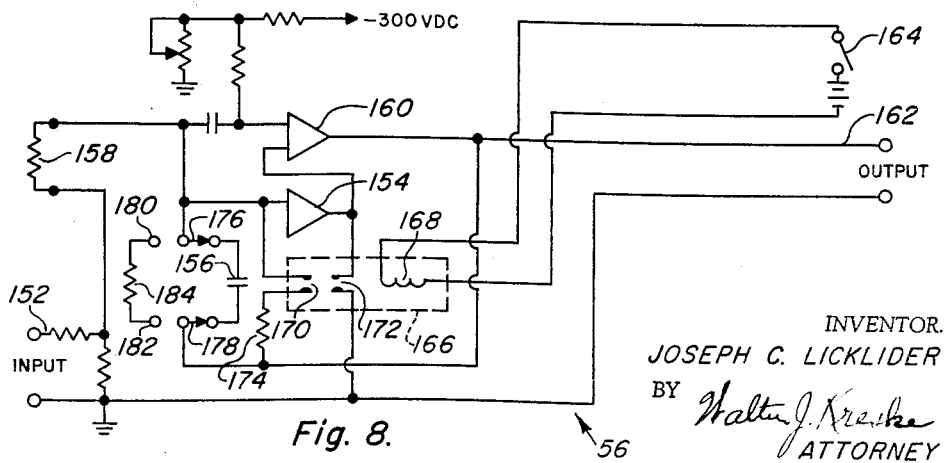
Fig. 8 is a schematic diagram of a voltage integrator circuit suitable for use in the embodiment shown in Fig. 1.

A circuit suitable for use as the voltake integrator 56 is shown in Fig. 8. The absolute difference output from the line 144 of the difference amplifier 52 is fed to input line 152 of the voltage integrator 56. The exemplary integrator circuit in Fig. 9 includes a high gain chopper stabilized D.C. amplifier 154 with a one microfarad feedback capacitor 156 which together with an integrator resistor 158 of approximately eight megohms provides a suitable total difference of approximately fifty volts for a zero test run such as when the 9 db noise level curve 29 in Fig. 2 appears in channel 10. The chopper stabilized D.C. amplifier 154 is arranged to minimize drift in a conventional amplifier 160 which provides the circuit output in line 162 to the meter 58. The chopper stabilized amplifier 154 may be of the variety commercially known as K2–P and the amplifier 160 may be of the variety commercially known as K2–X, both of which are manufactured by George A. Philbrick Researches, Inc., 230 Congress Street, Boston, Massachusetts.

After a test run as described above in connection with Fig. 1, the voltage integrator 56 may be recycled by closing a switch 164 to operate a dumping relay 166. Closing the switch 164 energizes a solenoid 168 in the dumping relay 166 so as to close contacts 170 and 172. The closing of contacts 170 discharges the integrator capacitor 156. A resistor 174 in the discharge circuit of the capacitor 156 is provided to protect the contacts 170. The closing of the contacts 172 discharges a capacitor (not shown) in the chopper stabilized amplifier 154. If desired a voltage stored on the integrator capacitor 156 may be held by throwing switch arms 176 and 178 to the terminals 180 and 182 respectively across a one megohm resistor 184.

This invention is not limited to the specific details of construction and operation described as equivalents will suggest themselves to those skilled in the art.

What is claimed is:

1. In an apparatus for measuring the intelligibility of speech information signals, the combination of a pair of signal traversing channels, a variable frequency carrier oscillator, a modulator in each of said channels coupled to said carrier oscillator, means for applying said speech signals substantially free of interfering signals to one of said modulators, means for applying said speech signals together with interfering signals to the other of said modulators, a scanning band-pass filter in each of said channels coupled to the modulator in the respective channel, an automatic gain control circuit in each of said channels coupled to the scanning band pass filter in the respective channel, a signal envelope detector in each of said channels coupled to the automatic gain control circuit in the respective channel, an amplitude difference amplifier coupled to both the envelope detectors for obtaining the absolute difference between the output signals and means coupled to the difference amplifier for integrating said difference.

2. In an electrical apparatus for measuring the intelligibility of information signals with interfering signals, the combination of a pair of signal traversing channels, one of said channels for said information signals substantially free of interfering signals, the other of said channels for said information signals mixed with interfering signals, means in each of said channels for scanning the band of frequencies covered by said information signals, means in each of said channels for desensitizing the channel to long-time signal level changes in the channel, means coupled to both of said channels for comparing said desensitized signal level of one channel with the desensitized signal level of the other channel, means for summing said comparison, and means for indicating said summation.

3. In an electrical apparatus for measuring the intelligibility of information signals mixed with interfering signals, the combination of a pair of signal traversing channels, one of said channels for said information signals substantially free of interfering signals, the other of said channels for said information signals mixed with interfering signals, means in each of said channels for scanning the band of frequencies covered by said information signals, means in each of said channels for obtaining a summation of the amplitudes of the signals in said scanned frequencies, means coupled to said scanning and summing means for normalizing the scanned signals, means for comparing the normalized signals of one channel with the normalized signals of the other channel, and means for indicating said comparison.

4. In an electrical apparatus for measuring the intelligibility of information signals mixed with interfering signals, the combination of a pair of signal traversing channels, one of said channels for said information signals substantially free of interfering signals, the other of said channels for said information signals combined with interfering signals, a varying frequency signal generating means for providing a scanning carrier signal, means coupled to said generating means and channels for heterodyning said scanning carrier signal with the signals in each of the said channels, narrow pass-band filter means coupled to the heterodyning means for isolating a small segment of the overall signal frequency band, means coupled to the filter means for normalizing the isolated signals, means coupled to both channels for comparing the level of said normalized signals of one channel with the normalized signals of the other channel, and means for indicating said comparison.

5. An apparatus as in claim 4, wherein the generating means includes means for varying the scanning frequency of said signal generating means at a rate such that the frequency band portions isolated in the scanning filter means provide in equal time periods substantially equal contributions to the over-all intelligibility of the information signal.

6. In an apparatus for evaluating the effects of interfering signals on the intelligibility of speech signals, a pair of electric signal traversing channels, a modulator in each of the channels, means for applying the speech signals to both of said modulators and the interference signals to one of the modulators, a varying frequency oscillator coupled to both said modulators, a narrow band-pass filter tuned to a sideband frequency of the oscillator and speech signal frequencies in each of said channels coupled to the respective modulator, automatic gain control means in each of said channels coupled to the respective filter, a signal envelope detector in each of the channels coupled to the respective automatic gain control means, means in each channel coupled to the detector and automatic gain control means for normalizing output of the automatic gain control means in the respective channel, and means coupled to both envelope detectors for comparing outputs of said detectors.

7. In an apparatus for evaluating the effects of interference signals on the intelligibility of speech, the combination of means for converting the speech into electric audio frequency signals covering an audio frequency band, means coupled to said converting means for separating said audio frequency band into a plurality of segments, each covering a portion of said band having substantially equal contributions to the intelligibility of said speech signals, electric interference signal generating means, means coupled to said converting means and interference signal means for separating said audio frequency and interfering frequency signals into segments substantially the same as those of said speech segments, means coupled to said separating means for separately summing the signals in the audio frequency segments and the combined audio frequency and interference frequency segments, means coupled to said summation means for comparing said summations, and means for indicating said comparison.

8. An apparatus as in claim 7, having additionally a means coupled to said summing means for making said summing means substantially insensitive to long term changes in signal level.

9. In an electrical apparatus for measuring the intelligibility of information signals in the presence of interfering signals in a given frequency band, the combination of a pair of electric signal traversing channels, one of said channels for said information signals substantially free of interfering signals, the other of said channels for said information signals in the presence of interfering signals, means coupled to both said channels for continuously scanning said band for narrow frequency range samplings constituting at any instant only a small portion of said band, means coupled to both said channels for comparing said narrow frequency range samplings and means coupled to said comparing means for indicating said comparison.

10. An apparatus as in claim 9 wherein said scanning means includes a time rate of scanning control arranged for varying the scanning rate over the frequency band in accordance with a preselected schedule.

11. An apparatus as in claim 9 wherein said scanning means includes control means for providing samplings proportioned for contributions of equal importance to overall intelligibility of said signals.

References Cited in the file of this patent

UNITED STATES PATENTS

| | | |
|---|---|---|
| 2,213,099 | Adorjan | Aug. 27, 1940 |
| 2,416,353 | Shipman et al. | Feb. 25, 1947 |
| 2,432,214 | Sontheimer | Dec. 9, 1947 |
| 2,705,742 | Miller | Apr. 5, 1955 |